United States Patent [19]

Kordomenos et al.

[11] Patent Number: 4,952,626
[45] Date of Patent: Aug. 28, 1990

[54] POLYESTER GRAFT COPOLYMERS, FLEXIBLE COATING COMPOSITIONS COMPRISING SAME AND BRANCHED POLYESTER MACROMONOMERS FOR PREPARING SAME - II

[75] Inventors: Panagiotis I. Kordomenos, Wayne, Pa.; Rose A. Ryntz, Midland, Mich.

[73] Assignee: E.I. du Pont de Nemours and Company, Wilmington, Del.

[21] Appl. No.: 281,826

[22] Filed: Dec. 9, 1988

Related U.S. Application Data

[63] Continuation-in-part of Ser. No. 45,591, May 4, 1987, abandoned.

[51] Int. Cl.$^5$ .............................................. C08L 51/08
[52] U.S. Cl. ...................................... 525/28; 525/440; 525/442
[58] Field of Search ................................ 525/28, 440

[56] References Cited

U.S. PATENT DOCUMENTS

| | | |
|---|---|---|
| 3,012,987 | 12/1961 | Ansul . |
| 3,763,079 | 10/1973 | Fryd . |
| 3,882,189 | 5/1975 | Hudak . |
| 3,954,899 | 5/1976 | Chang et al. . |
| 3,962,369 | 6/1976 | Chang et al. . |
| 3,962,522 | 6/1976 | Chang et al. . |
| 4,017,456 | 4/1977 | Tucker et al. . |
| 4,034,017 | 7/1977 | Chang et al. . |
| 4,134,873 | 1/1979 | Diaz et al. . |
| 4,522,976 | 6/1985 | Grace et al. . |
| 4,533,703 | 8/1985 | Kordomeros et al. . |

*Primary Examiner*—Patricia Short
*Attorney, Agent, or Firm*—John M. Lynn

[57] ABSTRACT

Coating composition containing hydroxy functional polyester graft copolymers are provided. The copolymer is crosslinkable by hydroxy-reactive crosslinking agent and, in particular, is suitable for use in thermosetting coating compositions adapted to form a flexible cured coating over a variety of substrates, such as metal and plastic. The copolymer has a number average molecular weight between about 1,300 and about 15,000, has a hydroxy number between about 30 and about 300, and is the reaction product of carbon-carbon double bond-reactive monoethylenically unsaturated monomer with hydroxy functional carbon-carbon double bond-bearing branched polyester macromonomer. The macromonomer is the reaction product of (i) isocyanato monomer having the formula:

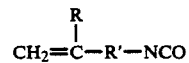

with (ii) hydroxy functional polyester reactant containing 0-1- urethane linkages per molecule.

22 Claims, No Drawings

POLYESTER GRAFT COPOLYMERS, FLEXIBLE COATING COMPOSITIONS COMPRISING SAME AND BRANCHED POLYESTER MACROMONOMERS FOR PREPARING SAME - II

CROSS REFERENCES TO RELATED APPLICATION

This application is a continuation-in-part of Ser. No. 07/045,591 filed May 4, 1987, now abandoned.

TECHNICAL FIELD

This invention relates to resins and flexible coating compositions comprising same which have excellent adherence to metal and plastic and possess superior weathering properties. More particularly, the invention relates to hydroxy functional polyester graft copolymers and to coating compositions comprising same.

BACKGROUND

Recently, there has been interest in the use of resilient coating materials for areas which are subject to mechanical shock, such as automobile bumpers, moldings and front ends. To maintain the desired appearance for a protective coating on a motor vehicle body panel or like application, any such coating must have certain properties, such as a high degree of extensibility, impact resistance, and resistance to cracking and degradation under severe environmental conditions such as low temperature and high humidity. Conventional coatings, including those heretofore employed on rubber and similar extensible objects, do not have the required combination of properties. Generally, compositions that are flexible enough to be applied over both metal and plastic substrates have rather poor weatherability, appearance, and/or overall durability.

U.S. Pat. No. 3,882,189 and U.S. Pat. No. 3,962,522 are exemplary of numerous patents which describe flexible coating compositions, wherein the resin comprises polyurethane modified polyesters formed by reacting polyisocyanate with polyester polyols. These resins are cured with amine-aldehyde crosslinkers. It is taught therein, that the presence of the urethane groups in the polymer significantly contributes to the flexibility as well as improved weathering properties, gloss, and abrasion resistance of the coating. Such coatings, however, are not of an overall quality to meet certain applications, particularly automotive applications. Accordingly, it is an object of the present invention to provide novel polyester graft copolymers and solvent based, thermosetting coating compositions comprising same, suitable to produce flexible cured coatings with good adhesion over diverse substrates including both metal and plastic substrates. In this regard, it is a particular object of the invention to provide such flexible coating compositions at sufficiently low Volatile Organic Content (VOC) to aid in meeting governmental emissions guidelines and yet which can be applied to a substrate by spraying or other known methods. It is another object of the invention to provide a composition which will form a coating on a substrate, which coating has advantageous physical properties including for example, humidity and solvent resistance, flexibility and corrosion protection for the underlying substrate.

Additional aspects and advantages of the invention will be apparent from the following description thereof.

DISCLOSURE OF THE INVENTION

According to the present invention, a novel, non-gelled, hydroxy functional polyester graft copolymer is provided. The copolymer is crosslinkable by hydroxy-reactive crosslinking agent and, in particular, is suitable for use in thermosetting coating compositions adapted to form a flexible cured coating over a variety of substrates, such as metal and plastic. The copolymer of the invention has a number average molecular weight between about 1300 and about 15,000, has a hydroxyl number, between about 30 and about 300, and is the reaction product of carbon-carbon double bond-reactive monoethylenically unsaturated monomer with hydroxy functional carbon-carbon double bond-bearing branched polyester macromonomer. This reaction is performed under free radical polymerization reaction conditions and the monomer bears substantially no functionality which would be substantially reactive with the hydroxy functionality of the macromonomer under such reaction conditions. The macromonomer is the reaction product of (i) isocyanato monomer having the formula:

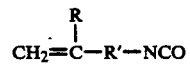

where R preferably is H or alkyl of 1 to about 7 carbons and R' is a divalent hydrocarbon linking moiety which does not substantially interfere with the reactivity of either the isocyanate group or the ethylenic double bond of the isocyanato acrylate, with (ii) hydroxy functional polyester reactant containing 0–10 urethane linkages per molecule. Preferably the divalent linking moiety, R', is $C_1$ to $C_7$ alkylene, $COO(CH_2)_n$, n being 1 to about 7, $CH(CH_3)C_6H_4C(CH_3)_2$, or $COO(CH_2)_m OCONHC_6H_x$—$Q_y$, m being from 1 to about 7, x and y together equaling 6 and each Q being any substituent group which does not substantially interfere with the reactivity of either the isocyanate group or the ethylenic double bond of the isocyanato monomer.

According to the coating composition aspect of the invention, the aforesaid copolymer is employed with polyfunctional, hydroxy-reactive crosslinking agent selected from aminoplast crosslinking agent, polyisocyanate crosslinking agent, blocked polyisocyanate crosslinking agent comprising at least two isocyanate groups blocked by reaction with active hydrogen bearing blocking agent, and any compatible mixture thereof. The crosslinking agent is included in an amount sufficient to provide, at a cure temperature of the composition, between about 0.5 and about 1.6 hydroxy-reactive groups per hydroxy group contributed by the hydroxy functional polyester graft copolymer.

The coating compositions of the invention can be formulated as either one component coating compositions or two component coating compositions. Typically, unblocked polyisocyanate crosslinking agent is employed in two component compositions in view of its reactivity. A composition of the invention can be formulated, for example, as a one component primer, typically employing blocked polyisocyanate or aminoplast crosslinking agent, as a one component topcoat, preferably employing aminoplast crosslinking agent, or as a two component coating, typically employing polyisocyanate crosslinking agent. Also, the polyester graft copolymer of the invention can be formulated as a pigmented base coat, typically a one component composition, for a base coat/clear coat system such as are known for use as automotive finishes. It also can be formulated as the clear coat thereof, either as a one component or a two component composition.

Advantageously, the flexible coatings of the invention possess superior weathering properties as well as excellent adhesion to metal and plastic, thus making them well suited for use as coatings on, for example, various motor vehicle components. The ability to use the same coating composition on metal and plastic components in motor vehicle production offers distinct commercial advantages, particular in terms of production efficiency. Additionally, because these coatings can be employed on metal as well as plastic components, the problem of color matching, which must be resolved when using different coatings on metal and plastic parts which are to be in proximity to one another, is eliminated. These and additional features and advantages of the invention will be better understood in view of the following detailed disclosure.

DETAILED DESCRIPTION OF THE INVENTION

The resin of the invention is a novel, hydroxy functional polyester graft copolymer of number average molecular weight ($M_n$) between about 1,300 and about 15,000, preferably between about 1,300 and about 4,000, and having a hydroxyl number between about 30 and about 300, preferably between about 50 and about 150. The resin is optionally urethane-modified, more specifically, containing about 0–10 urethane linkages per molecule. Preferably, the resin contains about 0–5 urethane linkages per molecule. As disclosed above, the resin is the reaction product of carbon-carbon double bond-reactive monoethylenically unsaturated monomer with certain hydroxy functional carbon-carbon double bond-bearing branched polyester macromonomer. Each of these reactant is discussed below in greater detail.

CARBON-CARBON DOUBLE BOND-REACTIVE MONOETHYLENICALLY UNSATURATED MONOMER

Numerous carbon-carbon double bond-reactive monoethylenically unsaturated monomers suitable for making the polyester graft copolymer are known to the skilled of the art. Included are many which are commercially available and many which will be readily apparent in view of the present disclosure. The choice of monomer reactant employed in making the polyester graft copolymer will depend to a large extent upon the particular application intended for the resin or for the coating composition in which the resin is to be used. Examples of suitable monoethylenically unsaturated monomers include, for example, vinyl aromatic hydrocarbons such as styrene, alpha methyl styrene, and vinyl toluene, vinyl acetate, vinyl chloride, and the like.

Preferred monomers are acrylate monomers. Numerous acrylate monomers suitable for preparing the hydroxy functional polyester graft copolymer are known to the skilled of the art and include many which are commercially available and which will be readily apparent in view of the present disclosure. As noted above, the choice of monomer reactant employed in preparing the resin of the invention will depend to a large extent upon the particular application intended for the resin or for the composition in which the resin is used. Suitable hydroxy-substituted alkyl(meth)acrylates (where "alkyl(meth)acrylates" means, in the alternative, alkylacrylates and alkylmethacrylates) which can be employed comprise members selected from the group consisting of the following esters of acrylic or methacrylic acid and C2–C12 aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxy-1methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexy) methacrylate; and 7-hydroxyheptyl methacrylate. Although one of ordinary skill in the art will recognize that many different hydroxy-substituted alkyl(meth)acrylates including those listed above could be employed, the preferred hydroxy functional monomers for use in the resin of this invention are hydroxy-substituted alkyl acrylates and methacrylates having a total of 5 to 7 carbon atoms, i.e., esters of C2–C3 dihydric alcohols and acrylic or methacrylic acids, such as hydroxyethyl methacrylate, hydroxyethyl acrylate, hydroxypropyl methacrylate and hydroxypropyl acrylate.

Most preferably, the hydroxy-substituted alkyl(meth)acrylate monomer comprises a compound of the formula:

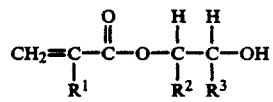

wherein $R^1$ is hydrogen or methyl and $R^2$ and $R^3$ are independently selected from the group consisting of hydrogen and alkyl of from 1 to 6 carbon atoms. Illustrative of these particularly suitable hydroxy-substituted alkyl(meth)acrylate monomers are 2-hydroxyethyl methacrylate, 2-hydroxyethyl acrylate, 2-hydroxypropyl acrylate, 2-hydroxybutyl acrylate and 2-hydroxy-1-methylhexyl acrylate.

Suitable non-hydroxy substituted alkyl(meth)acrylate monomers which may be employed are (meth)acrylates (as before, meaning esters of either acrylic or methacrylic acids) as well as mixtures of acrylates and vinyl hydrocarbons. Preferred non-hydroxy substituted monomers are esters of C1–C12 monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, glycidyl methacrylate, and the like.

Particularly preferred non-hydroxy substituted monomers are compounds selected from the group consisting of monomers of the formula:

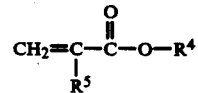

wherein $R^4$ is alkyl of from 1 to 6 carbon atoms and $R^5$ is hydrogen or methyl. Particularly preferred are butyl acrylate, butyl methacrylate and methyl methacrylate.

The aforesaid monovinyl aromatic hydrocarbons, Preferably containing from 8 to 12 carbon atoms, including styrene, alpha-methyl styrene, vinyl toluene, t-butyl styrene, chlorostyrene and the like, when employed, will generally be present in an amount of from about 5 to 95 weight Percent, preferably from about 5 to 25 weight percent of the total monoethylenically unsaturated monomer.

In addition, other suitable monoethylenically unsaturated monomers such as vinyl chloride, acrylonitrile, methacrylonitrile, vinyl acetate, acrylic acid and methacrylic acid also may be employed. In the case of acrylic acid, when employed, this monomer will generally be present in an amount from about 2 to 5 weight percent of the total monomer mixture. The remaining above-mentioned monomers will generally be used in an amount of from 3 to 10 weight percent of the monomer mixture, when employed.

HYDROXY FUNCTIONAL CARBON-CARBON DOUBLE BOND-BEARING BRANCHED POLYESTER MACROMONOMER

The hydroxy functional Polyester macromonomer is reacted with the above described monoethylenically unsaturated monomer according to any of various methods well known to the skilled of the art, which methods will be apparent in view of the present disclosure. Specifically, the macromonomer and the monomer are employed in a weight ratio of from about 90:10 to about 40:60, more preferably from about 75:25 to about 50:50, respectively. Preferably, all double bonds of the macromonomer are reacted with monomer double bonds. It will be apparent that the resulting resin will be hydroxy functional by virtue of the macromonomer hydroxyl groups and the monomer hydroxyl groups (if any). Suitable reaction conditions will be apparent to the skilled of the art and, generally, will include a solvent system and reaction temperature favoring free radical polymerization reaction.

The hydroxy functional polyester macromonomer is the reaction product of any of certain isocyanato monomer with any of certain hydroxy functional polyester. Each of these reactants is discussed below in greater detail.

ISOCYANATO MONOMER

Isocyanato monomer reactants suitable for reaction with hydroxy functional polyester in making the polyester macromonomer of the invention are those according to the formula:

wherein R preferably is hydrogen or alkyl of 1 to about 7 carbons, preferably $CH_3$, and R' is a divalent hydrocarbon linking moiety which does not substantially interfere with the reactivity of the isocyanate group or the ethylenic double bond of the isocyanato monomer Preferably R' is $C_1$ to about $C_7$ alkylene, $COO(CH_2)_n$, n being 1 to about 7, preferably about 2, $CH(CH_3)C_6H_4(CH_3)_2$, $COO(CH_2)_mOCONHC_6H_x$-$-Q_y$), m being from 1 to about 7, preferably about 2, x and y together equaling 6 and each Q being any substituent group which does not substantially interfere with the reactivity of either the isocyanate group or the ethylenic double bond of the isocyanato monomer, preferably being a single $CH_3$ group, or the like. Numerous such isocyanato monomers are well known to the skilled of the art and include many which are commercially available or readily prepared according to known methods. The choice of isocyanato monomer employed in preparing the polyester macromonomer will depend largely upon the particular application intended for the final resin or composition comprising the resin. Preferred isocyanato monomers include, for example, isocyanato ethyl methacrylate, which is most preferred, isocyanato propyl methacrylate, 1-(1-isocyanato-1-methylethyl)-3-(1-methylethenyl)benzene, and any compatible mixture thereof. Suitable isocyanato acrylates can be prepared, for example, by reacting a hydroxy functional acrylic monomer, such as hydroxy alkyl acrylate, for example hydroxy propyl acrylate or, preferably, hydroxy ethyl acrylate, with a diisocyanate. Preferred diisocyanates for this reaction are those wherein the two NCO groups of the molecule have different reactivities, such as isophorone diisocyanate and 2,4-toluene diisocyanate. Such reaction is carried out according to reaction techniques well known to the skilled of the art.

HYDROXY FUNCTIONAL POLYESTER

The hydroxy functional polyester has a number average molecular weight ($M_n$) preferably between about 1,000 and about 10,000, more preferably between about 1,000 and about 3,000, and has a hydroxyl number preferably between about 30 and about 300, more preferably between about 50 and about 150. As discussed further below, the polyester preferably, but not necessarily, is urethane modified, that is, bears urethane linkages in the polyester backbone. Suitable hydroxy functional polyesters, both urethane modified and unmodified, are known to the skilled of the art and will be apparent in view of the present disclosure. Such compounds can be prepared according to known methods which also will be apparent in view of the present disclosure. The choice of polyester reactant will depend to a large extent upon the particular application intended for the final resin or composition in which such resin is used.

The isocyanato monomer and polyester are reacted together according to known methods and reaction conditions. Typically, these two reactants are employed in molar ratio of about 2:1 to about 1:2, more preferably about 1:1. More generally, the isocyanato monomer is used in an amount insufficient to yield a gelled reaction product. Also, the isocyanato monomer reactant is used in an amount insufficient to react with all of the hydroxy functionality of the polyester, since the reaction product, the branched polyester macromonomer, must have hydroxy functionality to react with the crosslinking agent during cure. The reaction conditions for preparing the macromonomer should be selected to promote only the reaction between the NCO groups of the isocyanato monomer with the hydroxyl groups of the polyester reactant. A catalyst can be employed for the reaction between the NCO functionality and the hydroxy functionality of the polyester reactant. Suitable catalysts for this reaction are well known and include those described in Part I, Chapter IV of Polyurethanes, J. H. Saunders and K. E. Fruch, Wiley-Interscience, N.Y., 1962. Suitable commercially available catalysts include, for example, activators (which accelerate the heat activation of the reaction) such as the polyurethane catalysts of the conventional type, e.g., tertiary amines, such as triethyl amine, tributyl amine, N-methyl-morpholine, N-ethylmorpholine, N,N,N',N'-tetramethylenediamine, 1,4-diazabicyclo[2,2,2]octane, N-methyl-N'-dimethylaminoethylpiperazine, N-N-diethylbenzylamine, N-N-diethylbenzylamine, 2-methylimidazole, and the like. Other suitable catalysts are metal catalysts such as stannous chloride, stannous octoate, di-N-butyltindilaurate, stannous oxide, stannous oxalate, butyltintris(2-ethylhexoate), dibutyltin oxide and the like. Mixtures of the tertiary amines and metal catalysts can be used in a synergistic manner. Additional suitable catalysts will be apparent in view of the present disclosure. It is also preferred to employ an agent to inhibit polymerization reaction of the carbon-carbon double bonds of the isocyanato monomer reactant if the reaction temperature is to exceed 150° F. Suitable inhibiting agents are well known and include, for example, hydroquinone, benzoquinone, nitric oxide and others which will be apparent in view of this disclosure.

One suitable class of polyester reactants comprises the reaction products of polyol with dicarboxylic acid or an anhydride thereof and most preferably such polyesters are oligomeric polyesters. Preferably, the diacid is selected from the group consisting of saturated cyclic and acyclic aliphatic dicarboxylic acids, aromatic dicarboxylic acids, and suitable anhydrides thereof. Preferred dicarboxylic acids are the $C_6$–$C_{36}$ acids, which include, for example, adipic, azelaic, sebasic, dodecane dicarboxylic acid, and cyclohexanedicarboxylic acid and dimer acids. More preferably, the dicarboxylic acids employed are aliphatic dicarboxylic acids, most preferably additionally being linear, for example, adipic, azelaic, dimer, and dodecanoic. Also suitable for use as diacid are blocked dicarboxylic acids such as dimethyl-1,4-cyclohexanedicarboxylate. Mixtures of suitable diacids and/or their anhydrides may also be used as the dicarboxylic acid component in this invention.

Numerous suitable polyols for use in making the hydroxy functional polyester are known to the skilled of the art and will be readily apparent in view of the Present disclosure. Included are many commercially available polyols and others which are readily prepared according to known methods. Preferably, the polyol comprises diol and triol in hydroxyl equivalent ratio of from about 4:1 to about 1:4, more preferably from about 3:1 to about 3:2.5, respectively. Suitable diols include, but are not limited to, alkylene glycols, such as butylene glycol, neopentyl glycol, 1,5-pentene glycol, 3-cyclohexene-1,1-dimethylol, and other glycols such as hydrogenated bisphenol A, caprolactone diol (e.g., the reaction product of caprolactone and ethylene glycol), hydroxy alkylated bisphenol, polyether glycols, e.g., poly(oxytetramethylene) glycol, polyester diols, e.g., 2,2-dimethyl-3-hydroxypropyl-2,2-dimethyl-3-hydroxypropionate, and the like. Preferred diols are neopentyl glycol and 2,2-dimethyl-3-hydroxypropyl-2,2-dimethyl-3-hydroxypropionate, the latter material being commercially available as Esterdiol 204 ( trademark; Union Carbide Corp., Danbury, Conn.)

The polyol generally should comprise at least about 5 weight percent triol and may consist substantially entirely of triol. The polyol component also may comprise tetrols and higher functionality polyols, but these generally are less preferred. By employing diols in the polyol component in addition to the triols, the flexibility of the coating composition is generally increased. Thus, selection of the polyol component to be used in forming the polyester compositions will be dependent on the particular desired properties and application of the coating composition. When diols are employed in the polyol component, the polyol preferably comprises from about 10 to about 80 weight percent triols and from about 90 to about 20 weight percent diols. Preferred triols are conventional low molecular triols such as 1,2,6-hexanetriol, 1,1,1-trimethylolpropane, 3-(2-hydroxypropoxy)-1,2-propanediol and polycaprolactone triols, which are commercially available as, for example, Tone-301 (trademark; Union Carbide Corp., Danbury, Conn.). Additional preferred polycaprolatone triols are described in U.S. Pat. No. 4,165,345, incorporated herein by reference. Suitable tetrols will be apparent and include, for example, pentaerythritol and the like.

While a number of types of polyols have been mentioned above as suitable for use in making the hydroxy functional polyester reactant, their disclosure is not meant to be limiting. A great many additional suitable diols, triols, etc. are known in the art and selection of other polyols which would be suitable for use would be well within the skill of those in the art in view of this disclosure.

The polyol reactant (i.e., diols, triols and optionally tetrols, etc.) and diacid reactant are combined and reacted, generally in the presence of a catalyst and at elevated temperatures, to produce the aforesaid hydroxy functional polyester. Suitable catalysts for the carboxy/hydroxy condensation reaction include such catalysts as tetraisopropyl titanate, strong acids such as p-toluene phosphonic acid, phosphoric acid, sulfuric acid and materials such as zinc oxide, antimony oxide ($Sb_2O_3$), dibutyl tin oxide, hydrated monobutyl tin oxide, and sodium acetate. Other catalysts will be apparent to those skilled in the art in view of this disclosure. The polyol and dicarboxylic acid are reacted preferably in such proportions as to provide a molar equivalent ratio of OH to COOH from about 6:2 to about 6:5, respectively. Sufficient polyol must be used to provide a hydroxy functional polyester product.

As noted above, the hydroxy functional polyester is optionally urethane modified and typically may contain about 1–10 urethane groups per molecule. According to one embodiment of the invention, urethane groups are introduced by reaction of the above-described hydroxy functional polyester with organic diisocyanate. Such reaction is carried out according to known methods, generally in the presence of solvents commonly employed for coating formulations such as toluene, xylene, methyl amyl ketone, and the like. Numerous suitable organic diisocyanates are readily commercially available and will be apparent to the skilled the art in view of the present disclosure. Suitable diisocyanates include hydrocarbon diisocyanate or substituted hydrocarbon diisocyanate, such as 1,6-hexamethylene diisocyanate, isophorone diisocyanate, p-phenylene diisocyanate, biphenyl diisocyanate, toluene diisocyanate, and 3,3-dimethyl-4,4-biphenylene diisocyanate. While the diisocyanate may be any of a number of aliphatic, cycloaliphatic, and aromatic diisocyanates, it is preferred that the diisocyanate be an aliphatic diisocyanate, such as 4,4-dicyclohexylmethane diisocyanate. As would be apparent to those skilled in the art, mixtures of various diisocyanates may also be employed as the diisocyanate component used in forming urethane-modified polyester. Typically, the hydroxy functional polyester and diisocyanate are reacted in such proportions as to provide about 4-10 hydroxyl groups per isocyanate group.

While urethane modification may be introduced in the manner discussed above, according to an alternative embodiment of the invention the polyol component employed in reaction with dicarboxylic acid comprises urethane modified polyol. In this case, there is no need to react with diisocyanate the polyester reaction product of polyol and dicarboxylic acid. Employing urethane modified polyol is found to provide a final resin, i.e., a polyester graft copolymer, which is somewhat more flexible than when the urethane groups are introduced by reaction of the polyester with diisocyanate. Suitable urethane modified polyols are commercially available or readily prepared according to known methods. Exemplary urethane modified diols are made by reaction of diol and diisocyanate in a molar ratio of from about 4:1 to about 4:3, preferably from about 2:0.8 to about 2:1.2, more preferably about 2:1. Suitable diols and diisocyanates include those mentioned above. Such ratio of diol to diisocyanate (i.e., a molar excess of diol) causes the reaction product to be substantially free of unreacted isocyanate groups. This urethane modified diol is then combined with other portions of the polyol reactant (e.g., additional a diol, triol, tetrol, etc.) and the dicarboxylic acid reactant, generally at elevated temperature and in the presence of a catalyst (as discussed above) to produce the hydroxy functional polyester, specifically, a hydroxy functional urethane modified polyester. It will be apparent to those skilled in the art, that urethane modified triol, urethane modified tetrols, etc. can be used in addition to or in lieu of urethane modified diol, according to the methods and guidelines discussed above, to provide hydroxy functional urethane modified polyester.

COATING COMPOSITIONS

According to another aspect of the invention, the above-described hydroxy functional polyester graft copolymer is employed in an organic solvent based thermosetting coating composition together with suitable polyfunctional hydroxy-reactive crosslinking agent. Such crosslinking agent is selected, preferably, from aminoplast crosslinking agents and polyisocyanate crosslinking agents, either blocked or unblocked depending upon the intended application. Coating compositions of the invention can be formulated so as to be suitable for numerous different applications including, particularly, as motor vehicle body panel coatings. Thus, for example, a coating composition of the invention can be formulated as a primer or as a topcoat, such as a basecoat for a basecoat/clearcoat system, a clearcoat for a basecoat/clearcoat system, or as a one-coating topcoat. Moreover, any of these coatings can be formulated as either a one-component (i.e., resin and crosslinker combined) or a two-component (i.e., resin and crosslinker segregated) coating composition, except that the basecoat of a base/clear system generally would be formulated only as a one-component coating in view of the high pigment content thereof and the mixing and dispersion problems which would result in attempting to add the crosslinking agent at the time of application to a substrate. It is, of course, well known to the skilled of the art to employ unblocked polyisocyanate crosslinking agents generally only in two-component formulations to prevent premature reaction thereof with the hydroxy functional copolymer. Blocked polyisocyanate crosslinkers are employed in one-component coatings, but typically these are employed in primers since the two-component unblocked polyisocyanate coatings of the invention are found generally to provide better surface appearance. The amino resin crosslinking agents also are employed, typically, in one component formulations.

In a coating composition intended for use as a high solids basecoat or clear coat of a base/clear automotive coating formulation, typically it is preferred that the polyester graft copolymer have a number average molecular weight ($M_n$) between about 1,500 and about 3,000, more preferably between about 1,500 and about 2,500. Also, for such use the resin preferably has a hydroxy number between about 50 and about 150.

CROSSLINKING AGENT

The crosslinking agent is generally included in compositions of the invention in an amount between about 5 and about 60 weight percent, preferably in an amount between about 20 and about 50 weight percent based on the weight of the copolymer and crosslinker combined. Selection of the optimal amount of crosslinking agent to be employed in the coating composition is dependent on the desired properties (e.g., flexibility) of the coating as well as its intended use, and selection of such amount would be within the skill of one in the art.

Polyisocyanate crosslinking agents are well known in the art and numerous suitable organic isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which can be employed are (1) aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, 4,4'-bis(isocyanate hexyl) methane, bis(2-isocyanate-ethyl)-fumarate, 2,6-diisocyanate methyl caproate, 2,2,4-(2,4,4)-trimethylhexamethylene diisocyanate, and dimer acid diisocyanates; (2) cycloaliphatic diisocyanates such as 1,3-cyclopentane diisocyanate, 1,4-cyclopentane diisocyanate, 1,2-cyclopentane diisocyanate, and methylcyclohexylene diisocyanate; (3) aromatic diisocyanates such as m-phenylene diisocyanate, p-phenylenediisocyanate, 4,4'-diphenyl diisocyanate; (4) aliphatic/aromatic diisocyanates such as 4,4'-diphenylene methane diisocyanates, 2,4- or 2,6-tolylene diisocyanate, 4,4'-toluidene diisocyanate, 1,4-xylylane diisocyanate; (5) nuclear substituted aromatic compounds such as dianisidine diisocyanate, 4,4'-diphenylether diisocyanate, chlorodiphenylen diisocyanata; (6) triisocyanates such as triphenylmethane-4,4',4''-triisocyanate, 1,3,5-triisocyanate benzene, 2,4,6-triisocyanate toluene; (7) tetraisocyanates such as 4,4'-diphenyl dimethylmethane 2,2',5,5'-tetraisocyanate;

ed isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triols, pentaerythritol and the like, as well as monoethers, e.g., diethylene glycol, tripropylene glycol and the like, and polyethers, i.e., alkylene oxide condensates of the above. While the polyisocyanate crosslinking agent may be any organic polyisocyanate as has been noted above, such crosslinking agents for coating composition to be employed as clear (top) coats are preferably aliphatic and cycloaliphatic polyisocyanates, due to their superior weatherability.

Especially preferred for use in clearcoat compositions of the invention are trimerized products of aliphatic diisocyanates such as 1,6-hexamethylene diisocyanate. Still another particularly preferred of crosslinking agent is a polyisocyanate having a biuret structure. This type of polyisocyanate is well known, as are methods for making the same. Suitable such polyisocyanate crosslinking agents are high molecular weight biurets of 1,6-hexamethylene diisocyanate sold by Mobay Chemical Company under the trademarks Desmodur N and Desmodure L 2291. Exemplary of other biuret type polyisocyanates are those prepared in accordance with U.S. Pat. No. 3,976,622 to Wagner et al.

Blocked polyisocyanate crosslinking agents are well known to the skilled of the art and many suitable for use in compositions of the invention are commercially available or readily prepared and will be apparent from the present disclosure. More specifically, blocked polyisocyanate crosslinking agents comprise the reaction product of a polyisocyanate, such as those mentioned above, with a blocking agent, that is, an active hydrogen-bearing reactant. Exemplary blocked polyisocyanates are described, for example, in U.S. Pat. No. 4,497,938, which description is incorporated herein by reference. Blocked polyisocyanate crosslinking agents are used generally in the same proportions disclosed above for unblocked polyisocyanate crosslinking agents.

Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. Particularly preferred crosslinkers are the high solids melamine resins which have substantially 95+percent nonvolatile content. For so-called "high solids" compositions of this invention, it should be recognized that it is important not to introduce extraneous diluents that lower the final solids content of the coating. Other suitable amine-aldehyde crosslinking agents will be apparent to one skilled in the art. Amine-aldehyde crosslinking agents are preferred for basecoat compositions of the invention. The amine-aldehyde crosslinking agent is generally included in a basecoat composition in an amount of between about 5 and about 60, preferably between about 20 and about 40 weight percent. However, selection of the particular amount of amine-aldehyde crosslinking agent to be employed in any such composition is dependent on the desired properties of the composition as well as its intended use and would be apparent to one skilled in the art.

Particularly preferred crosslinking agents are the amino crosslinking agents sold by American Cyanamid under the trademark "Cymel". In particular, Cymel 301, 303, 325, 1130, 1156, 1161 and 1168 (trademarks). are alkalated melamine aldehyde resins useful in the compositions of this invention. The crosslinking reactions are catalytically accelerated by acids. One such catalyst, for example, which may be so employed is P-toluene sulfonic acid, which when employed is generally added to the composition in about 0.5% by weight based on the total weight of the polyester graft copolymer and crosslinking agent.

ADDITIONAL MATERIALS

Additional materials which may be employed in the coating compositions of this invention include a high molecular weight linear polyurethane which has a number average molecular weight of between about 15,000 and about 40,000, preferably between about 20,000 and about 30,000. It may be made by reacting one of the above mentioned diisocyanates and diols, such as oligoester diol, polycaprolactone diol, polyoxypropylene diol, polyether diols, etc. Suitable high molecular weight linear polyurethane materials are commercially available, for example, as Spenlite L06-30S, (trademark, Spencer-Kellogg, Buffalo, N.Y.). It has been found that these high molecular weight polyurethanes may be employed in metallic flake pigment-bearing topcoat compositions in small amounts, typically up to about 15 weight percent based on the total weight of the polyester graft copolymer and crosslinking agent, to improve the orientation of the metallic flake pigment in the cured coating. It has been found that by including such linear polyurethane, for example, in a basecoat of a basecoat/clearcoat system, the depth of color and metallic glamour of the system may be improved.

Other materials which may be included in the coating compositions of this invention include, for example, catalysts, antioxidants, U.V. absorbers (for topcoats), solvents, surface modifiers and whitening agents. Solvents used in the coating composition of this invention are those which are commonly used, e.g., to facilitate spray application and high solids content and include toluene, xylene, methylethyl ketone, acetone, 2-ethoxy-1-ethanol, diacetone alcohol, tetrahydrofuran, ethyl acetate, dimethylsuccinate, dimethylglutarate, dimethyladipate and mixtures thereof. The solvent in which the polyester graft copolymer is prepared may be employed as a solvent for the composition, thus eliminating the need for drying the resin after preparation, if such is desired.

Typical ultraviolet light stabilizers that are useful in topcoat compositions of this invention are benzophenones such as dodecyl oxibenzophenone, 2,4-dihydroxybenzophenone, hydroxybenzophenones containing sulfonic groups, 2,4-dihydroxy-3',5'-ditertiarybutylbenzophenone, 2,2',4'-trihydroxybenzopheone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2-carboxybenzophenone, triazoles such as 2-phenyl-4-(2',4'-dihydroxybenzolyl)-triazoles, substituted benzotriazoles such as hydroxyphenyltriazoles such as 2-(2'-hydroxy-5'-methylphenyl)benzotriazole, 2-(2'-hydroxyphenyl)benzotriazole, and 2-(2'-hydroxy-5'-octylphenyl)naphthiotriazole.

Another type of ultraviolet light stabilizer and one that is particularly preferred for use in the coatings of this invention is that taught in U.S. Pat. No. 4,480,084 entitled "Polymeric Light Stabilizers" to Kordomenos et al. These stabilizers contain the sterically hindered polyalkylpiperidine radical and at least two primary hydroxyl groups available for reacting with the cross-linking agent, e.g., amine-aldehyde or Polyisocyanate, of the coating composition.

Typical antioxidants which may be employed in the coating composition include tetrakis alkylene (di-alkyl hydroxy aryl) alkyl ester alkanes such as tetrakis methylene 3-(3',5'-di-tert-butyl-4'-hydroxyphenyl)proprionate methane (available under the trademark Irganox 1010 from Ciba-Geigy Corp.). Also suitable are the reaction product of p-amino diphenylamine and glycidyl methacrylate, the reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilinophenyl)maleimide, alkylhydroxyphenyl groups bonded through carboalkoxy linkages to nitrogen atom of a heterocyclic nucleus containing an imidodicarbonyl group or an imidodithiocarbonyl group, 3,3-ditertbutyl-4-hydroxycinnamonitrile, ethyl-3,5-diterthexyl-4-hydroxycinnamate, substituted benzyl esters of beta-substituted (hydroxyphenyl)-propionic acids, bis-(hydroxyphenylalkylene)alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxyphenyl aryl or alkyl phosphonites or phosphonates or phosphates or phosphinites or phosphinates or phosphionites or phosphorothionates or phosphinothionates, diphenyl-bis(3,5-ditertbutyl-4-hydroxyphenoxy)silane, hydrocarbylhydroxyphenyl-dihydrocarbyldithio-carbamates such as 3,5-ditertbutyl-4-hydroxyphenyl dimethyldithiocarbamate and amino benzyl thioether.

In one preferred embodiment a base/clear topcoat system is provided, wherein both the basecoat, and the clearcoat comprise a resin and crosslinker composition according to the invention. The basecoat would preferably contain only a benzotriazole U.V. stabilizer such as Tinuvin 328 (trademark, Ciba-Geigy, Ardsley, N.Y.), and the clearcoat would contain a benzotriazole U.V. stabilizer, e.g., Tinuvin 328, the polymeric hindered amine light stabilizer of the aforementioned U.S. Pat. No. 4,480,084 to Kordomenos et al and an antioxidant, e.g., Irganox-1010 (trademark; Ciba-Geigy). While preferred combinations of stabilizers and antioxidants have been described, these teachings are not meant to be limiting. Selection of suitable stabilizers and antioxidants is within the skill of one in the art.

Surface modifiers or wetting agents are common additives for liquid paint compositions. The exact mode of operation of these surface modifiers is not known, but it is thought that their presence contributes to better adhesion of coating compositions to the surface being coated and helps formation of thin coatings, particularly on metal surfaces. The choice of surface modifiers or wetting agents is dependent upon the type(s) of surface to be coated. Selection of appropriate surface modifiers is well within the skill of the art. Typical of these surface modifiers are polybutyl acrylate and a wide variety of silicon wetting agents which are commercially available.

For many applications of the coating compositions of the invention, particularly high solids compositions, it may be desirable to employ flow control additives to provide sag free coatings. Among the many such materials which are known are non-aqueous dispersions (NAD's) such as described by Porter (S. Porter, Jr., and B. N. McBane, U.S. Pat. No. 4,025,474, (May 24, 1977). These particle dispersions may be included generally in an amount up to 15% by weight of the total composition. Other types of NAD's such as described by D. L. Maker and S. C. Peng (U.S. Pat. No. 3,814,721, Jun. 4, 1974) or by S. K. Horvath (U.S. Pat. No. 4,415,681, Nov. 15, 1983) also may be included in the coating compositions.

Coating compositions according to certain embodiments of the invention may contain pigments. Thus, for example, primer compositions and the basecoat of a base/clear system may comprise any of the wide variety of suitable pigments which are known to the art and readily commercially available. Selection of suitable pigments and the amounts of same will depend largely on the intended use and desired properties of the coating, for example, desired color, hiding properties, etc., and is within the skill of those in the art.

The coating composition can be applied by conventional methods known to those in the art. These methods include roll coating, spray coating, dipping or brushing. The particular application technique chosen will depend upon the particular substrate to be coated and the environment in which the coating operation takes place. Preferred techniques for applying these coating compositions, particularly when applying the same to automobiles, is spray coating through the nozzle of the spray gun. A basecoat, for example, can be applied as a single component by means of a single component spray gun. On the other hand, in spray applying a two component clearcoat composition, the polyester graft copolymer and additives such as pigments, U.V. absorbers, antioxidants and other nonreactive materials are admixed with a solvent. These materials are fed as one component of a two component system into a spray gun which combines the materials as they are sprayed into the automotive substrate. The other material is the polyisocyanate crosslinking agent, which may or may not be cut with a suitable nonreactive solvent.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

Hydroxy functional, urethane modified, carbon-carbon double bond-bearing branched polyester macromonomer was prepared according to this example. First, hydroxy functional oligomeric polyester, more specifically, a urethane modified hydroxy functional oligomeric polyester was Prepared. Into a suitable reactor were charged 720 parts Esterdiol-204 (trademark; Union Carbide, Danbury, Conn.; 2,2-dimethyl-3-hydroxy-propyl-2,2-dimethyl-3-hydroxypropionate), 216 parts trimethylolpropane, 504 parts adipic acid, and 2 parts dibutyl tin oxide. The mixture was heated to 300° F. and water was distilled off until the acid number dropped below 10. The batch was then thinned with 150 parts xylene and the temperature was raised to 350° F. and maintained there until the acid number dropped to 2. The temperature was lowered to 200° F. and 255 parts Desmodur-W (trademark; Mobay Chemical Co., diisocyanate) was added dropwise in a period of one hour. After addition was complete, the mixture was postreacted at 200° F. until no NCO was observed in an IR spectrum. At this point the resulting hydroxy functional polysiloxane reactant was used to prepare the macromonomer. The batch was thinned with xylene to 40% non-volatiles and cooled to 20° F. Then was added 121 parts isocyanato ethyl methacrylate dropwise in a period of 2 hours. The batch was kept at 120° F. for another 5 hours until substantially all the NCO groups had reacted, as shown by the absence of NCO peak in an IR spectrum. The resulting macromonomer was cooled and stored for use in Example V.

EXAMPLE II

Hydroxy functional oligomeric polyester was Prepared according to this example. In a suitable reactor 720 parts Esterdiol-204 (trademark; Union Carbide Corp.), 490 parts Tone 0301 (trademark; Union Carbide Corp.; polycaprolactone triol), 252 parts adipic acid, 255 parts phthalic anhydride, and 2 parts dibutyl tin oxide were charged. The mixture was heated to 350° F. and water distilled off until the acid number dropped to 5. The temperature was lowered and the batch was thinned with 571 parts xylene. The temperature was raised to 200° F. and 133 parts Desmodur-W (trademark; Mobay Chemical Co.; diisocyanate) was added dropwise over a period of 2 hours. The mixture was postreacted at 200° F. until no isocyanate was observed in an IR spectrum (2270 cm$^{-1}$). The batch was thinned with 1623 parts xylene to afford a resin with an A viscosity at 42% non-volatiles.

EXAMPLE III

Hydroxy functional oligomeric polyester was prepared according to this example. In a suitable reactor 498 parts triethylene glycol, 71 parts trimethylol propane, 197 parts 1,4-cyclohxanedimethanol, 1.83 parts Fascat 4100 (trademark; M&T Chemicals, Inc,; catalyst), and 0.87 parts para-toluene sulfonic acid were charged. The mixture was heated to 300° F. and water was distilled off until the acid number reached 10.2. The batch was thinned with 148 parts xylene. The temperature was lowered to 200° F. and 76 parts Desmodur-W Trademark; Mobay Chemical Co.; diisocyanate) was added dropwise over a period of 2 hours. After addition was complete, the mixture was postreacted at 200° F. until no isocyanate group was observed in an IR spectrum (2270 cm$^{-1}$). The resin had a T viscosity at 67% non-volatiles.

EXAMPLE IV

Hydroxy functional oligomeric polyester was prepared according to this example. In a suitable reactor 204 parts Esterdiol-204 (trademark; Union Carbide Corp.; diol), 66 parts trimethylol propane, 75 parts dimethyl-1,4-cyclohexanedicarboxylate, 55 parts adipic acid and 0.76 parts Fascat 4100 (trademark; M&T Chemicals, Inc.; catalyst) were charged. The mixture was headed to 325° F. and water was distilled off until the acid number dropped below 10. The batch was thinned with 180 parts xylene. The temperature was lowered to 180° F. and 38 parts isophorone diisocyanate was added dropwise over a period of 2 hours. After addition was complete, the mixture was postreacted at 200° F. until no NCO group was observed in an IR spectrum. The resin had a viscosity of S at 69% non-volatiles.

EXAMPLE V

Hydroxy functional polyester graft copolymer within the scope of the invention was prepared according to this example. In a suitable reactor were charged 220 parts xylene, 3.6 parts cumene hydroperoxide. The mixture was heated to 270° F. In a separate vessel 892 parts of the macromonomer of Example I was mixed with 214 parts butyl methacrylate and 3.6 parts t-butyl perbenzoate. This second mixture was added dropwise to the cumene hydroperoxide solution in a period of 4 hours. The temperature was maintained at 270° F. for an additional 2 hours. The mixture was then stripped of solvent to 60% non-volatiles.

EXAMPLE VI

Hydroxy functional, urethane modified, carbon-carbon double bond-bearing branched polyester macromonomer was prepared according to this example. First, hydroxy functional oligomeric polyester, more specifically, a urethane modified hydroxy functional oligomeric polyester was prepared. Into a suitable reactor were charged 485 parts triethylene glycol, 71 parts trimethylol propane, 323 parts dimethyl-1,4-cyclohexanedicarboxylate, 1.75 Parts dibutyl tin oxide, and 0.87 part paratoluene sulfonic acid solution (40% active in butanol). The mixture was heated to 350° F. and water was distilled off until the acid number dropped to below 6. The mixture was cooled to 175° F. and 200 Parts xylene was added. Desmodur-W, 119.3 Parts, was added in a period of one hour. The mixture then was kept at 200° F. until no NCO peak was observed in an IR spectrum This intermediate Product then was used to prepare urethane modified, hydroxy functional, branched polyester macromonomer. Specifically, the batch was thinned to 40% non-volatiles with xylene and cooled to 120° F. Next, 56.6 parts isocyanate ethyl methacrylate was added dropwise over a Period of 2 hours. The batch was kept at 120° F. for another 5 hours until substantially all NCO groups had reacted, as determined by the absence of an NCO peak in an IR spectrum. The macromonomer product was stored for use in Example VII.

EXAMPLE VII

Hydroxy functional polyester graft copolymer within the scope of the invention was prepared according to the following procedure. Into a suitable reactor were charged 220 parts xylene and 3.6 parts cumene hydroperoxide. The mixture was heated to 275° F. and a mixture of 892 parts of the resin from Example III, 196 parts iso-butylmethacrylate, 20 parts hydroxypropylacrylate, and 3.6 parts t-butyl perbenzoate was added dropwise over a period of 5 hours. The mixture was postreacted at 275° F. for an additional 2 hours and then stripped of xylene to 60% non-volatiles.

EXAMPLES VIII AND IX

One component coating formulations within the scope of the invention, useful as the basecoat of a base/clear motor vehicle coating system were formulated according to the compositions shown in Table A. The resin of Example V or VII was mixed with linear polyurethane modifying agent, crosslinking agent, aluminum paste, xylene, isopropanol and then wetting agent, in that order. Following thorough mixing, paratoluene sulfonic acid ("PTSA") was added, with additional mixing. The viscosity of the coating formulations was reduced in each case to 15 sec. #4 Ford Cup (80° F.) with methyl amyl ketone prior to use in Examples X-XIII.

TABLE A
BASECOAT COMPOSITION

| Composition | Example VIII | Example IX |
|---|---|---|
| Resin of Example V | 58 | |
| Resin of Example VII | | 58 |
| Spenlite L06-305[1] | 100 | 100 |
| Cymel 1130[2] | 46 | 46 |
| Tinuvin-328[3] | 3.6 | 3.6 |
| PTSA (40% in butanol) | 1.5 | 1.5 |
| SS-5000A4[4] | 50 | 50 |
| Xylene | 75 | 75 |
| Isopropanol | 75 | 75 |
| Surfynol-104[5] | 6 | 6 |

[1]Trademark; Spencer-Kellog, Buffalo, N.Y.; linear polyurethane modifying agent for aluminum pigment orientation.
[2]Trademark; American Cyanamid Co., Wayne, N.J.; alkylated melamine crosslinking agent.
[3]Trademark; Ciba-Geigy; U.V. absorber.
[4]Trademark; Silberline Mfg. Co., Lansford, PA; aluminum paste.
[5]Trademark; Air Products and Chemicals, Inc., Allentown, PA; surfactant (wetting agent).

EXAMPLES X-XIII

One and two component coating compositions within the scope of the invention, useful as the clearcoat of a base/clear motor vehicle coating system, were formulated as shown in Table B. The order and manner of addition was as follows. In the case of one component coatings formulated with Cymel 1130 (trademark, American Cyanamid), the resin was mixed with n-butylacetate, a UV stabilizer/absorber package, butyl acrylate, methyl amyl ketone, and tetralin. This mixture was added to a premixed solution of Cymel 1130, blocked acid catalyst, cellosolve acetate, and xylene. The viscosity of the coating composition was adjusted to 24 sec. #4 Ford Cup (80° F.) with a mixture of 8:2 xylene : 2-ethylhexanol. In the case of two component coatings formulated with an organic polyisocyanate, the resin was mixed with n-butyl acetate, a UV stabilizer/absorber package, polybutylacrylate, methyl amyl ketone, and tetralin. To this mixture the polyisocyanate, predissolved in xylene and cellosolve acetate, was added just before the coating composition was applied by spraying. The viscosity of the coating formulations was adjusted to 22 sec. #4 Ford Cup (80° F.) with 8:2 xylene : 2-ethylhexanol. The coating compositions were sprayed onto Bonderite steel panels and RIM panels which had first been sprayed with the high solids basecoat of Example VIII. The clearcoat was applied wet-on-wet. The panels then were baked for 30 minutes at 250° F. The resultant coatings were smooth, tough films with excellent flexibility, and excellent resistance to chemical attack and oxidation.

TABLE B
CLEARCOAT COMPOSITIONS

| COMPOSITION | X | XI | XII | XIII |
|---|---|---|---|---|
| Resin of Example V | 71 | | 71 | |
| Resin of Example VII | | 71 | | 71 |
| n-butyl acetate | 7.2 | 7.2 | 7.2 | 7.2 |
| UV stabilizer/absorber package[1] | 13.8 | 13.8 | 13.8 | 13.8 |
| Polybutyl acrylate | 0.96 | 0.96 | 0.96 | 0.9 |
| Methyl amyl ketone | 18.2 | 18.2 | 18.2 | 18.2 |
| Tetralin[2] | 12 | | 12 | 12 |
| Xylene | 10 | 10 | 14 | 14 |
| Cellosolve Acetate | 1 | 1 | 1 | 1 |
| Blocked acid catalyst[4] | 1.2 | 1.2 | | |
| Cymel 1130[3] | 14.1 | 14.1 | | |
| Desmodur N-3390[5] | | | 22.8 | 22.8 |

[1]Solution of 25 parts TIN 079L, 8 parts TIN 900, 7 parts TIN 328 (trademarks; Ciba-Geigy) and 60 parts xylene.
[2]1,2,3,4-tetrahydronaphthalene.
[3]Trademark; American Cyanamid Company; hexamethoxymelamine crosslinking agent.
[4]Nacure 2500X (trademark; King Industries); blocked paratoluene sulfonic acid catalyst.
[5]Trademark; Mobay Chemical Corporation; organic polyisocyanate crosslinking agent.

EXAMPLE XIV

A millbase suitable for use in coating compositions of the invention was prepared by grinding in a ball mill the following mixture:

| Composition | Parts |
|---|---|
| Resin of Example V | 70 |
| Anti-Terra U[1] | 19 |
| Barium sulfate | 547 |
| TiO$_2$ | 103 |
| Carbon black | 4 |
| Xylene | 150 |

[1]Trademark; Byk Mallinckrodt; anti-settling and wetting agent.

The mixture was ground to a Hegman Gauge value of from about 6.5 to about 8. The mixture then was let down with an additional 46 parts resin of Example V plus 50 parts toluele. The product millbase was used in Example XV.

EXAMPLE XV

A two component primer coating composition was prepared by mixing the following components.

| Composition | Parts |
|---|---|
| Millbase of Example XIV | 746 |
| Resin of Example V | 496 |
| Desmodur L-2291A[1] | 150 |
| Methyl amyl ketone | 50 |

[1]Trademark; Mobay Chemical Corportion; organic polyisocyanate crosslinking agent.

The composition was mixed quickly (within 5 minutes), reduced to a viscosity of 19 sec. #4 Ford Cup (80° F.) and applied by spraying onto both Bonderite steel panels and plastic panels (RIM-polyurethane). The panels then were baked at 250° F. for 30 minutes. The resultant coatings were smooth, tough films with excellent solvent resistance (passing 20+MEK rubs).

EXAMPLES XVI-XVII

Two component enamel coating compositions within the scope of the invention were formulated as shown in Table C. The order and manner of addition was as follows. First, the graft copolymer resin was mixed with flow control additive (polybutyl acrylate, Cook Paint and Varnish Company, Kansas City, Mo.); cellosolve acetate butyrate ("CAB") and 2-ethyl hexyl acetate. Subsequently, aluminum paste which had been predissolved in 15 parts butyl cellosolve acetate was added to the mixture. After the aluminum paste was dispersed, the remaining butyl cellosolve acetate was added. The isocyanate crosslinker, predissolved in 30 parts methyl amyl ketone, was added just prior to spraying the coating compositions onto panels. Also, the viscosity of the paint was adjusted fast with methyl amyl ketone to 20 sec. #4 Ford Cup (80° F.). The coating composition was sprayed onto Bonderite steel panels and also onto plastic panels (RIM-Polyurethane). The panels then were baked for 30 minutes at 250° F. The resultant cured coatings were found to be smooth, tough films with excellent flexibility and MEK resistance.

TABLE C

Two Component Enamel Coating Compositions

| Compositions | Examples | |
|---|---|---|
| | XVI | XVII |
| Resin of Example V | 230 | 230 |
| Flow control additive | 5 | 5 |
| Cellosolve Acetate Butyrate[1] | 2 | 2 |
| 2-ethyl hexyl acetate | 15 | 15 |
| Aluminum paste[2] | 9 | 9 |
| Butyl cellosolve acetate | 50 | 50 |
| Desmodur L-2291[3] | 71 | |
| Desmodur Z-4370[3] | | 107 |
| Methyl amyl ketone | 30 | 30 |

[1]EAB 381-0.1 available from Eastman Chemicals Co.
[2]8199-AR available from Silberline, Lansford, Pennsylvania.
[3]Trademark; Mobay Chemical Corp.; organic polyisocyanate crosslinking agent.

EXAMPLE XVIII

A flexible clearcoat composition within the scope of the invention was prepared by mixing the following components.

| Composition | Parts |
|---|---|
| Resin of Example V | 223 |
| Cymel 1130[1] | 60 |
| Tinuvin-328[2] | 3 |
| U.V. stablizer[3] | 6 |
| Irgano 1010[4] | 0.5 |
| PTSA (40% solution) | 5 |

[1]Trademark; American Cyanamid Co.; alkylated melamine crosslinking agent.
[2]Trademark; Ciba-Geigy; UV absorber.
[3]Polymeric hindered amine prepare according to Example 1 of United States Pat. No. 4,480,084.
[4]Trademark; Ciba-Geigy; anti-oxidant.

The composition was mixed in the order listed above. The viscosity of the composition then was reduced to 30 sec. #4 Ford Cup (80° F.) with methyl amyl ketone. The composition was used in Example XIX.

EXAMPLE XIX

The basecoat of Example VIII and the clearcoat of Example XVIII were employed to provide a corrosion inhibiting film on steel and plastic substrates in accordance with the present invention. The basecoat of Example VIII was reduced to 20 sec. #4 Ford Cup (80° F.) with methyl amyl ketone and sprayed to a coating thickness of 0.7 mil on Bonderite steel panels and plastic panels (RIM-polyurethane). Next, the clearcoat of Example XVIII was sprayed over the basecoat, wet-on-wet, to a clearcoat thickness of 1.5 mils. The panels then were baked at 250° F. for 30 minutes to cure the coatings. The resulting cured coatings were found to be smooth, tough films with excellent flexibility and solvent (MEK) resistance.

INDUSTRIAL APPLICABILITY

It will be apparent from the foregoing that this invention has industrial applicability as a protective coating, for example on motor vehicle body panels, and for like applications and provides a flexible, durable coating for metal, plastic and other substrates.

We claim:

1. Thermosetting, flexible, solvent-based coating composition comprising a hydroxy functional polyester graft copolymer and a hydroxy-reactive crosslinking agent, wherein the hydroxy functional graft copolymer has number average molecular weight between about 1,300 and 15,000, has a hydroxyl number between about 30 and 300, and is the reaction product of carbon-carbon double bond-reactive monoethylenically unsaturated monomer with hydroxy functional carbon-carbon double bond-bearing branched polyester macromonomer, under free radical polymerization reaction conditions, said monomer bearing substantially no functionality which is substantially reactive with hydroxy functionality of said macromonomer under said reaction conditions and said macromonomer being the reaction product of (i) isocyanato monomer having the formula:

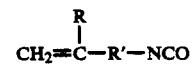

wherein R is hydrogen or $C_1$ to about $C_7$ alkyl, and R' is a divalent hydrocarbon linking moiety which does not substantially interfere with the reactivity of either the isocyanate group or the ethylenic double bond of said isocyanato monomer with (ii) hydroxy functional saturated polyester reactant having about 0-10 urethane groups per molecule.

2. The coating composition of claim 1, wherein said divalent hydrocarbon linking moiety, R', of said isocyanato monomer is $C_1$ to about $C_7$ alkylene, $COO(CH_2)_n$, n being 1 to about 7, $CH(CH_3)C_6H_4C(CH_3)_2$ or $COO(CH_2)_mOCONHC_6H_{x}-Q_y$, m being 1 to about 7, x and y together equaling 6 and each Q being any substituent group which does not substantially interfere with the reactivity of either the isocyanate group or the ethylenic double bond of said isocyanato monomer.

3. The coating composition of claim 2, wherein R is selected from H and $CH_3$ and in said divalent linking moiety, R', the variable y is 1 and said substituent Q is $CH_3$.

4. The coating composition of claim 1, wherein said isocyanato monomer is selected from the group consisting of isocyanato ethyl methacrylate, isocyanato propyl methacrylate, 1-(1-isocyanato-1-methylethyl)-3-(1-methylethenyl)-benzene, and any compatible mixture thereof.

5. The coating composition of claim 1, wherein said isocyanato monomer is the reaction product of hydroxy alkyl acrylate with diisocyanate.

6. The coating composition of claim 5, wherein said hydroxy alkyl acrylate consists essentially of hydroxy ethyl acrylate.

7. The coating composition of claim 5, wherein said diisocyanate is selected from the group consisting of isophorone diisocyanate, 2,4-toluene diisocyanate and any mixture thereof.

8. The coating composition of claim 1, wherein said isocyanato monomer and said hydroxy functional saturated polyester reactant are reacted in approximately 1:1 molar ratio.

9. The coating composition of claim 1, wherein said carbon-carbon double bond-reactive monoethylenically unsaturated monomer is selected from the group consisting of alkylacrylate, alkyl methacrylate, hydroxyalkylacrylate, hydroxyalkyl methacrylate and mixtures thereof, wherein each alkyl and hydroxyalkyl moiety has one to about seven carbons.

10. The coating composition of claim 1, wherein said carbon-carbon double bond-reactive monoethylenically unsaturated monomer is selected from the group consisting of acrylic acid, methacrylic acid, styrene, methylacrylate, ethylacrylate, propylacrylate, butylacrylate, methylmethacrylate, ethylmethacrylate, propylmethacrylate, butylmethacrylate, hydroxyethylacrylate, hydroxypropylacrylate, hydroxybutylacrylate, hydroxyethylmethacrylate, hydroxypropylmethacrylate, hydroxybutylmethacrylate, and any mixture thereof.

11. The coating composition of claim 1 wherein said hydroxy functional saturated polyester reactant comprises the reaction product of dicarboxylic acid with polyol comprising at least about 5 percent by weight triol, said dicarboxylic acid being selected from the group consisting of saturated, cyclic, and acyclic aliphatic dicarboxylic acids and aromatic dicarboxylic acids, suitable anhydrides thereof, and mixtures thereof.

12. The coating composition of claim 11, wherein said dicarboxylic acid is selected from the group consisting of substantially saturated, acyclic, aliphatic dimer acids of about 6 to 36 carbons.

13. The coating composition of claim 11, wherein said dicarboxylic acid is selected from the group consisting of adipic acid, azelaic acid, sebasic acid, dodecane dicarboxylic acid, phthalic anhydride and any mixture thereof.

14. The coating composition of claim 11, wherein said polyol comprises diol and triol in hydroxy equivalent ratio of from about 4:1 to about 1:4.

15. The coating composition of claim 14, wherein said diol has molecular weight of about 60–500 and is selected from the group consisting of trimethylene glycol, triethylene glycol, 1,4-cyclohexane dimethanol, alkyl substituted or unsubstituted propanediol, butanediol, pentanediol and hexanediol, and a mixture of any of them.

16. The coating composition of claim 14, wherein said triol is selected from the groups consisting of trimethylol propane, polycaprolactone triol, and any mixture thereof.

17. The coating composition of claim 14, wherein said diol is aliphatic diol of the general formula HO—R''—OH, wherein R'' is a divalent, aliphatic, linking moiety substantially unreactive with said dicarboxylic acid.

18. The coating composition of claim 17, wherein said aliphatic diol has a molecular weight of about 60–500 and is selected from the group consisting of trimethylene glycol, triethylene glycol, 1,4-cyclohexane dimethanol, alkyl substituted or unsubstituted propanediol, butanediol, pentanediol and hexanediol, and a mixture of any of them.

19. The coating composition of claim 14, wherein said diol is selected from the group consisting of alkylene glycol of about 2–7 carbons, and any mixture thereof.

20. The coating composition of claim 11, wherein said hydroxy functional saturated polyester reactant is urethane modified, said polyol comprising the reaction product of organic diisocyanate with polyhydroxy reactant.

21. The coating composition of claim 20, wherein said diisocyanate is selected from the group consisting of phenylene diisocyanate, biphenyl diisocyanate, toluene diisocyanate, isophorone diisocyanate, 3,3'-dimethyl-4,4'-biphenylene diisocyanate, diisocyanatoalkane wherein the alkane moiety has about three to about ten carbons, and a compatible mixture of any of them.

22. The coating composition of claim 1, wherein said hydroxy functional saturated polyester reactant is urethane modified, comprising the reaction product of organic diisocyanate with the reaction product of dicarboxylic acid with polyol comprising at least about 5 percent by weight triol, said dicarboxylic acid being selected from the group consisting of saturated cyclic and acyclic aliphatic dicarboxylic acids, aromatic dicarboxylic acids, suitable anhydrides thereof, and any mixture thereof.

* * * * *